United States Patent [19]

Young

[11] Patent Number: 4,689,735
[45] Date of Patent: Aug. 25, 1987

[54] POWER SUPPLY FOR SINGLE-PHASE TRACTION SYSTEM

[75] Inventor: David J. Young, Stafford, England

[73] Assignee: Associated Electrical Industries Limited, England

[21] Appl. No.: 826,549

[22] Filed: Feb. 6, 1986

[30] Foreign Application Priority Data

Feb. 6, 1985 [GB] United Kingdom ............... 8503045

[51] Int. Cl.[4] .......................................... H02M 5/10
[52] U.S. Cl. .................................. 363/155; 323/356; 323/361
[58] Field of Search ................... 104/288, 295; 191/2, 191/3, 7; 323/206, 208, 215, 218, 249, 356, 361, 910; 363/2, 3, 39, 153, 154, 155

[56] References Cited

U.S. PATENT DOCUMENTS

| | | | |
|---|---|---|---|
| 2,977,398 | 3/1961 | Wleugel | 323/104 |
| 3,053,920 | 9/1962 | Seitz | 323/150 |
| 3,963,978 | 6/1976 | Kelley et al. | 323/210 |
| 4,025,834 | 5/1977 | McClain et al. | 361/113 |
| 4,551,780 | 11/1985 | Canay | 363/39 |

FOREIGN PATENT DOCUMENTS

1085920  9/1980  Canada ............................. 323/20

Primary Examiner—Patrick R. Salce
Assistant Examiner—Jeffrey Starrett
Attorney, Agent, or Firm—Kirschstein, Kirschstein, Ottinger & Israel

[57] ABSTRACT

A traction power supply system in which one, two or three single-phase traction loads are supplied from a 3-phase high voltage system. Balancing of the load in each phase of the high voltage system and reduction of reactive currents in that high voltage system is achieved by simulating any further single-phase load or loads necessary to make the number up to three and providing individual controllable balancing circuits for all of the single phase circuits together with individual harmonic filters designed to include accommodation of the harmonic currents generated by the balancing circuits.

11 Claims, 10 Drawing Figures

POWER SUPPLY FOR SINGLE-PHASE TRACTION SYSTEM

BACKGROUND OF THE INVENTION

1. Field of the Invention

This invention relates to A.C. power supplies particularly for use with single-phase traction supply systems.

2. Description of Related Art

Single phase A.C. traction systems are well established, especially at 25 kV. This relatively low voltage is derived from a high voltage system by transformation at a substation. Current is drawn from a main supply (catenary) conductor at 25 kV and returns, at earth potential, through the track and a conductor bonded to the track at intervals and together constituting an earth return conductor. The 25 kV system impedance is relatively high: thus voltage regulation is a problem and it is normal to design for locomotive operation in the range +10–30% i.e. 27.5 to 17.5 kV. Even so, distances between feeder stations must be relatively short, especially for heavily loaded conditions (e.g. mineral trains). In such cases a 50 kV supply system has sometimes been found advantageous to reduce supply voltage drops while still using 25 kV locomotives. The traction system catenary wire is fed from one terminal of the 50 kV supply and a supplementary feeder wire is supplied from the other terminal. 50/25 kV autotransformers are connected at intervals between the catenary and the feeder wire with their tapping point earthed and connected to the traction return conductor. Thus both the catenary wire and the feeder will operate at 25 kV from earth, but with 180° phase displacement.

There are several other features of traction supply systems which may require alleviating measures. The locomotives do not draw sinusoidal currents and commutation effects of the on-board converters excite the natural resonances of the traction system. Harmonic filters and/or damping circuits are sometimes necessary to prevent excessive levels of harmonic currents flowing into the supply system and to prevent the voltage distortion on the 25 kV traction system itself from reaching levels which would cause damage to other equipment, including the locomotives themselves.

The single phase traction loads cause negative phase sequence currents to flow in the HV supply system. Unless this HV system is strong (i.e. has low impedance), the consequential negative phase sequence voltages may reach levels which would be damaging to other equipment, particularly machines fed from the HV system. In order to reduce the levels of unbalance, the traction supplies at a given traction substation are sometimes arranged to be supplied from different phases of the HV supply, but emergency operating conditions normally entail that the total maximum load may still be supplied from one phase only. Where the negative phase sequence voltages on the HV system are intolerable, high-speed controllable phase-balancing devices may be connected to the HV system to limit the negative phase sequence voltage.

Figure 1:
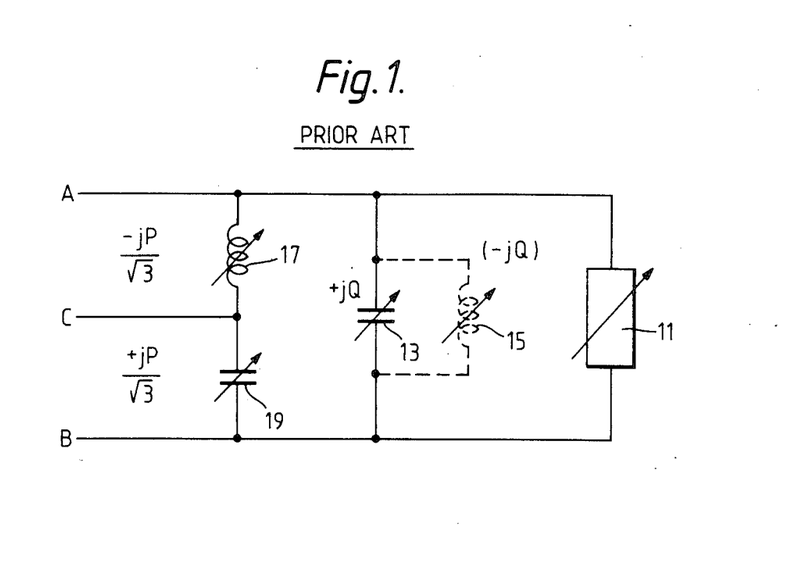
FIG. 1 is a known circuit for converting a single-phase load into a balanced three phase load according to the prior art.

FIG. 1 of the accompanying drawings shows a well-known basic arrangement often adopted for converting a single-phase load of any power factor into a balanced 3-phase load of unity power factor using only reactive elements for the balancing equipment.

A single-phase load 11 in phase A-B, has a load rating represented by P−jQ is inductive, (absorbing reactive power), or P+jQ if capacitive, (generating reactive power). In parallel with the single-phase load 11 in phase A-B is connected a device 13 to give reactive power generation, i.e. capacitance power rating +Q, sufficient to balance the lagging reactive power, Q, of the load (or, if the load power factor is leading, a device 15 shown in broken lines to give reactive power absorption, i.e. inductance power rating −Q, sufficient to balance the leading reactive power of the load). The single-phase load is thus converted to unity power factor and of value P. Into phases B-C and C-A are connected other reactive devices, 19 of value +jP/√3 and 17 of value −jP/√3.

The compensating load in phase B-C must be capacitive and in phase C-A must be inductive for a system in which the positive phase sequence is A-B-C.

If the load in phase A-B is a variable load, then the phase-balancing circuit components 13/15, 17 and 19 in the three phases must also be varied in a pro-rata manner to P and Q as appropriate in order to maintain the load seen by the supply system as a unity power factor load, albeit variable in magnitude.

Traction loads are not constant. They vary due to the effects of gradients on the track, starting, stopping, shunting and the response of the driver to signals etc. In addition, power is instantaneously shut off and rapidly restored as locomotives enter and leave the neutral sections which are used to isolate the different sections of the traction supply system. Such changes will cause corresponding voltage fluctuations on the HV system, which may in turn cause disturbance or annoyance to other consumers and may therefore require to be attenuated to a tolerable level.

In some cases the power factor of the traction load is poor and there would be merit in the application of power factor correction equipment.

Although the various techniques for counteracting these adverse effects of traction systems are well-known and established, their independent application generally involves some lack of economy of materials due to secondary effects. Thus in a case where both traction harmonics and unbalance effects are unacceptable to the HV system, the connection of single-phase harmonic filters to the traction supply system would impose an additional fixed negative phase sequence load which must then itself be compensated. Any excessive harmonics produced by the phase-balancing device will normally need to be separately absorbed by additional filters; the phase-balancing device will usually be supplied via a stepdown transformer from the HV system, in which case the additional filters will normally be connected to its LV side. Although it may seem advantageous to use a common set of harmonic filters connected directly to the HV system to absorb both the traction harmonics and the phase-balancer's harmonics, no advantage is usually realised because, in order to be effective, the filters must have a much higher admittance (and therefore higher fundamental rating) when connected to an HV system compared with an LV system (because of the lower magnitude of HV sytem harmonic impedance). In addition, the transferral of capacitive MVAr from LV to HV side of the phase-balancer will usually increase the rating of the balancer's stepdown transformers and, for the traction system, the HV filters will no longer be properly effective in reducing the harmonic voltage distortion on the catenary system itself.

SUMMARY OF THE INVENTION

An object of the present invention is therefore to overcome, or alleviate, some at least of the above problems arising particularly in single-phase traction systems.

According to the present invention, in an a.c. power supply system in which a high voltage three-phase system is transformed to provide one or more phases of a low voltage system connected for the supply of respective single-phase loads, a respective phase-balancing circuit is provided for each of three single-phases provided or derived from the transformed supply, the phase-balancing circuits being controllable to tend to reduce negative phase-sequence currents in the high voltage system.

Each phase-balancing circuit may be associated with a respective harmonic filter for the absorption of load-generated harmonic currents, each harmonic filter being additionally adapted to accommodate harmonic currents generated by the associated phase-balancing circuit.

The low voltage system may comprise, for each loaded phase, a main supply conductor, an earth return conductor and a supplementary supply conductor, the main and supplementary conductors being connected to a supply transformer secondary winding of greater voltage than the operating low voltage, a required proportion of the greater voltage being applied between the main and earth return conductors by an auto-transformer connected between the main and supplementary conductors. Each phase-balancing circuit may be connected between main and supplementary supply conductors and each harmonic filter between main supply conductor and earth return.

Where two single-phase transformers are connected to supply single-phase loads, a third single-phase transformer may be provided to supply a said phase-balancing circuit.

Where two single-phase transformers are connected to supply single-phase loads and respective phase-balancing circuits, an auto-transformer may be connected across the secondary winding of one of said single-phase transformers to provide a voltage in antiphase with the voltage of that secondary winding, connections to the other secondary winding and the auto-transformers providing a third phase voltage for the supply of a third phase-balancing circuit.

Where two single-phase transformers are connected to supply single-phase loads and respective phase-balancing circuits, the secondary windings of the two single-phase transformers may be connected together at one end in appropriate phase relationship such that the voltage between their other ends provides the third phase for supplying a third phase-balancing circuit.

Where two single-phase transformers are connected to supply two single-phase loads each by way of main, supplementary and earth return conductors, a third phase-balancing circuit may be connected between the appropriate conductors of said two single-phase loads to derive a third phase voltage.

Where the system includes two single-phase supply transformers for supplying two single-phase loads, a three-phase step-down transformer may be provided having delta-connected primary windings one of which is connected between an appropriate conductor of each of said single-phase loads to derive a third phase voltage, the remaining junction of the delta windings being earthed to provide three phase currents in the delta windings, and the secondary windings of the three-phase transformer being connected to respective phase-balancing circuits. In this arrangement two of the harmonic filters may be connected between each main conductor and its associated earth return and a third harmonic filter connected in parallel with the one delta-connected primary winding.

BRIEF DESCRIPTION OF THE DRAWINGS

A number of embodiments of power supplies for single-phase traction systems will now be described, by way of example, with reference to the accompanying drawings of which.

DETAILED DESCRIPTION OF THE PREFERRED EMBODIMENTS

There are significant potential advantages in combining all the necessary corrective measures for imbalance, voltage fluctuations and harmonic distortion and applying them directly to the traction system. However, phase balancing requires a three-phase supply and the traction system is usually only single or two-phase. In such cases it may be necessary or desirable to add one or more traction and/or other transformers to provide an effective three-phase supply for the overall compensating system as will be explained.

Figure 2:
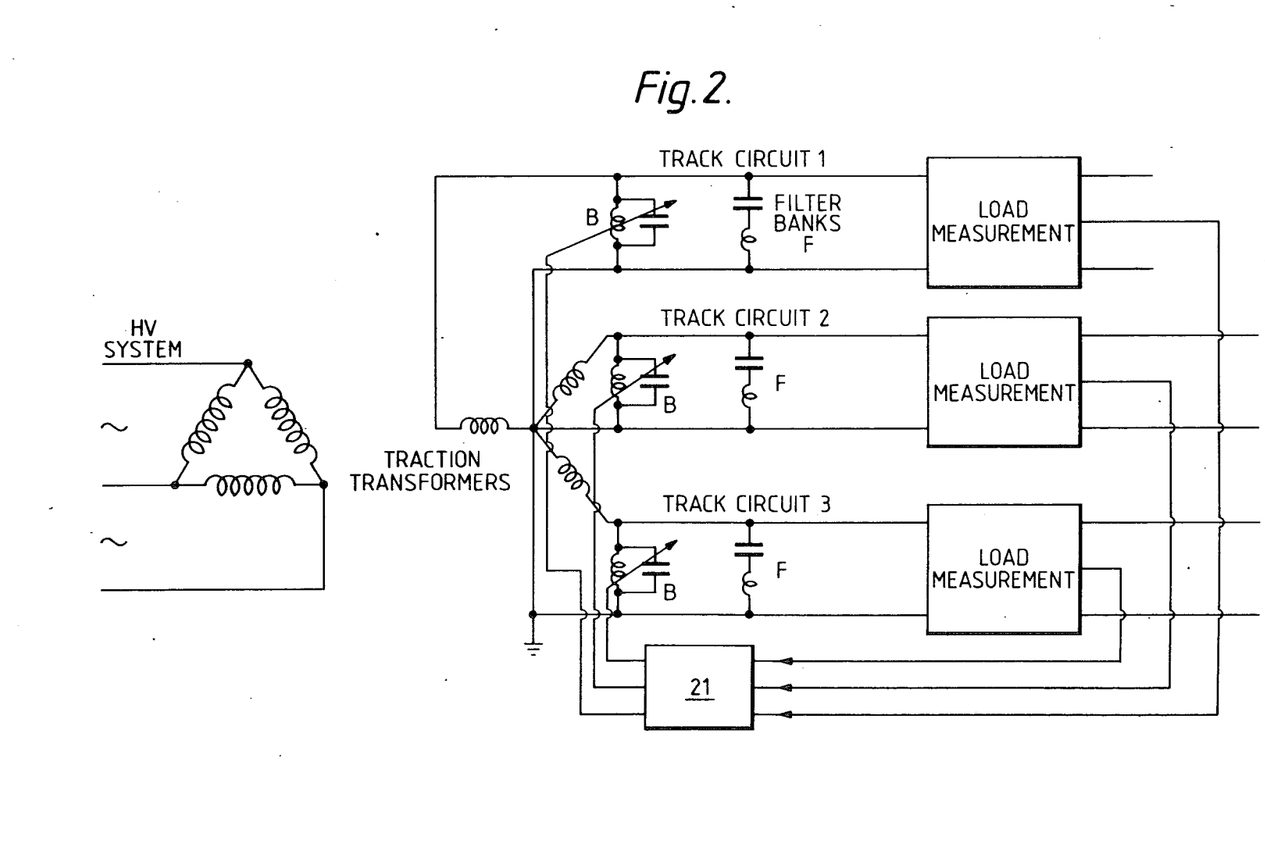
FIG. 2 is a circuit diagram of one embodiment of a power supply system according to the invention for feeding three separate single-phase traction loads.

For a traction substation at which 3 single-phase transformers are available, any of which may supply a traction load independently of the others, FIG. 2 shows a possible arrangement. The transformer shown may be three-phase or may be 3 single-phase transformers. Each 25 kV track section 1, 2 and 3 may have its own harmonic filters F which may be independently connected or directly associated with the track section (as shown), or with the compensating equipment or with the traction transformers or with any combination of these. The phase-balancing equipment B comprises inductors and/or additional capacitors, which may be directly connected as shown, or fed through an interposing transformer and may be permanently connected as shown, switched or otherwise variable for example by means of a static var compensator, employing thyristor switches with point-on-wave control and/or forced commutation methods or devices, the output of the phase-balancing equipment being controlled by means of a device 21 which monitors the load current or impedance and/or system voltage or any function of combination of these and controls the magnitude and phase of the impedance of the phase balancers B such that the negative phase sequence component of the overall load imposed on the HV supply system is limited to an acceptable value. The overall power factor of the load and hence the magnitude of the positive phase sequence disturbance may also be controlled by means of equal adjustment of the reactive generation or absorption of each phase.

Figure 3:
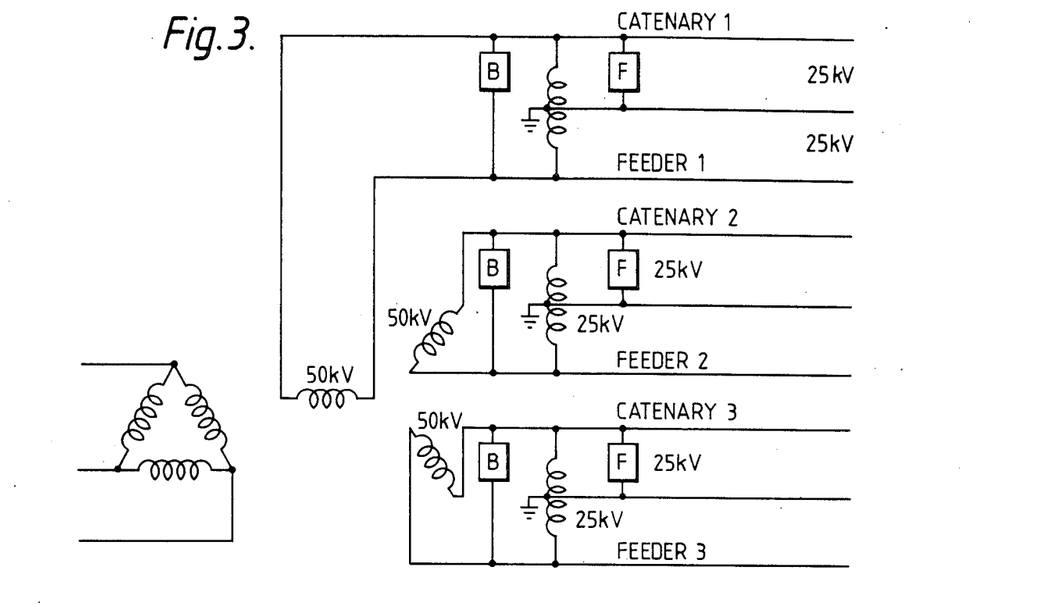
FIG. 3 shows a similar system employing a 50 kV supply for three 25 kV single-phase traction systems.

The above arrangement can be adapted in the case of a 50 kV supply system to use equipment connected at either 25 kV or 50 kV or both as may be found advantageous. FIG. 3 shows a typical arrangement using 50 kV phase-balancing devices B and 25 kV harmonic filters F.

Figure 4:
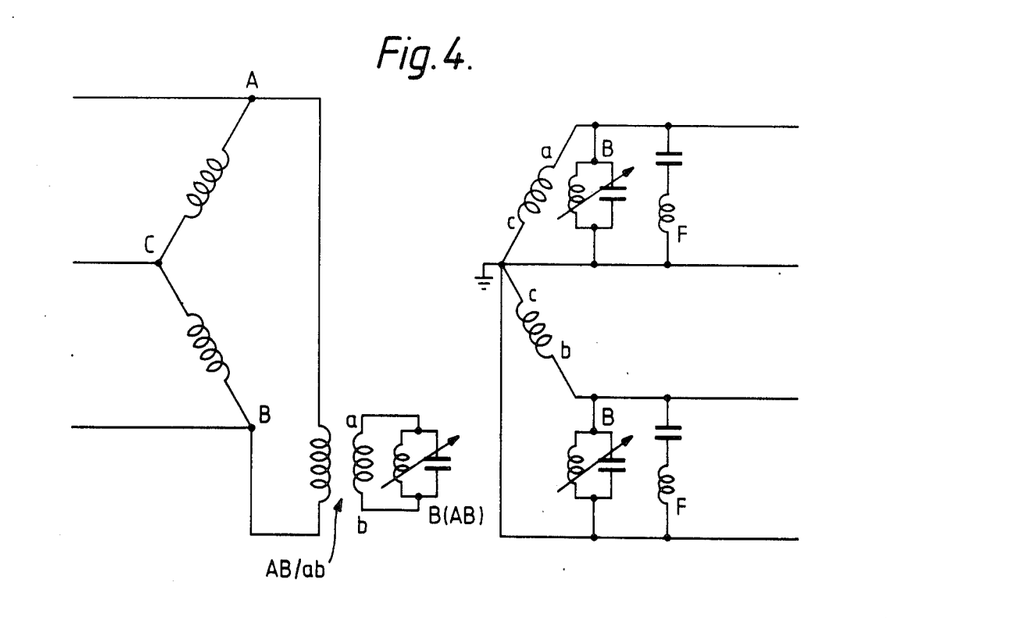
FIG. 4 shows the derivation of a third phase for balancing purposes in a two-phase system for separate single-phase loads.

In substations where only two transformers are installed (AC/ac or BC/bc) several alternatives may be considered to make available a third phase for the balancing equipment. FIG. 4 shows how this may be achieved in a conventional way by the addition of a third transformer AB/ab across the otherwise unloaded phase pair A-B. The third transformer may conveniently be identical to the other two transformers, for standardisation, or may be chosen to give a more optimal rating and ratio for the phase-balancing equipment B(AB) connected to it. In certain cases the third transformer could be dispensed with and the phase balancing components B(AB) for phase A-B connected directly to the HV system.

Figure 5A:
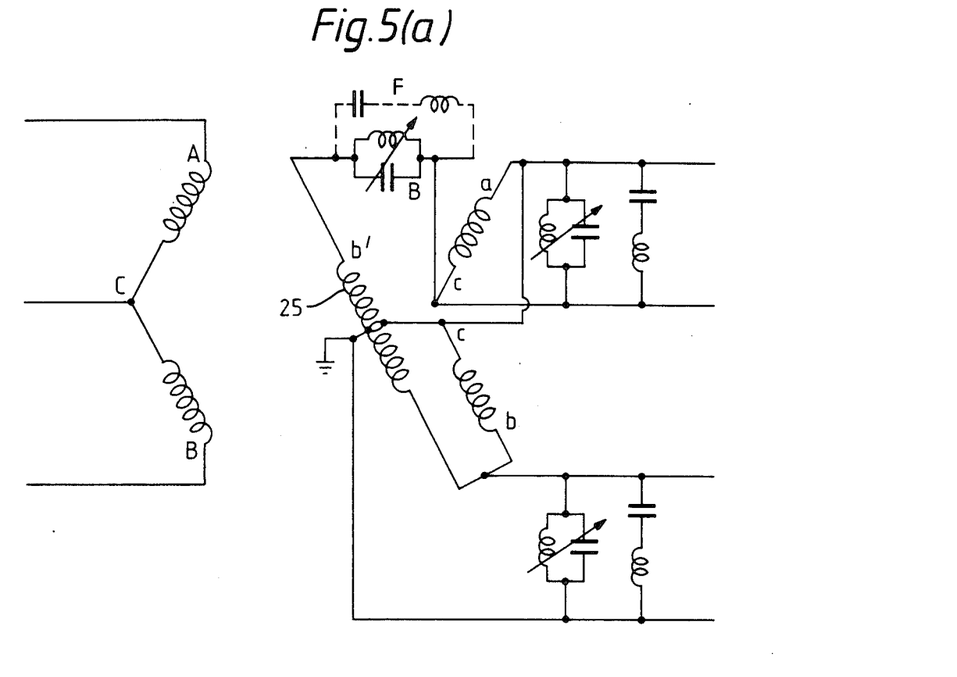
FIG. 5(a) shows an alternative system to FIG. 4 for providing a third phase in a two-phase system.
Figure 5B:
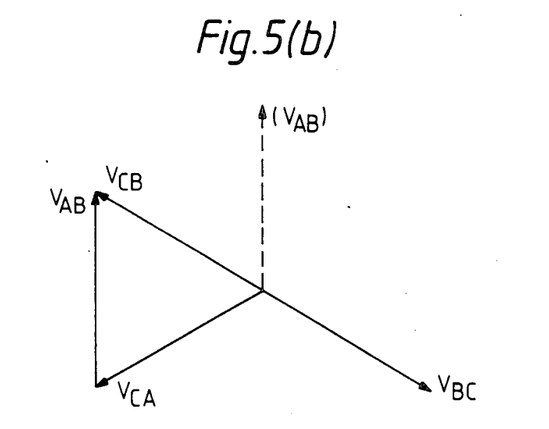
FIG. 5(b) is a vector diagram for the circuit of FIG. 5(a)

FIG. 5a shows how an auto-transformer 25 connected across one of the traction transformer secondaries (bc) may be used to obtain a third phase, the vector diagram being shown in FIG. 5b. The phase-balancing equipment of B, in parallel with an optional filter F, is connected across the third phase AB.

Figure 6:
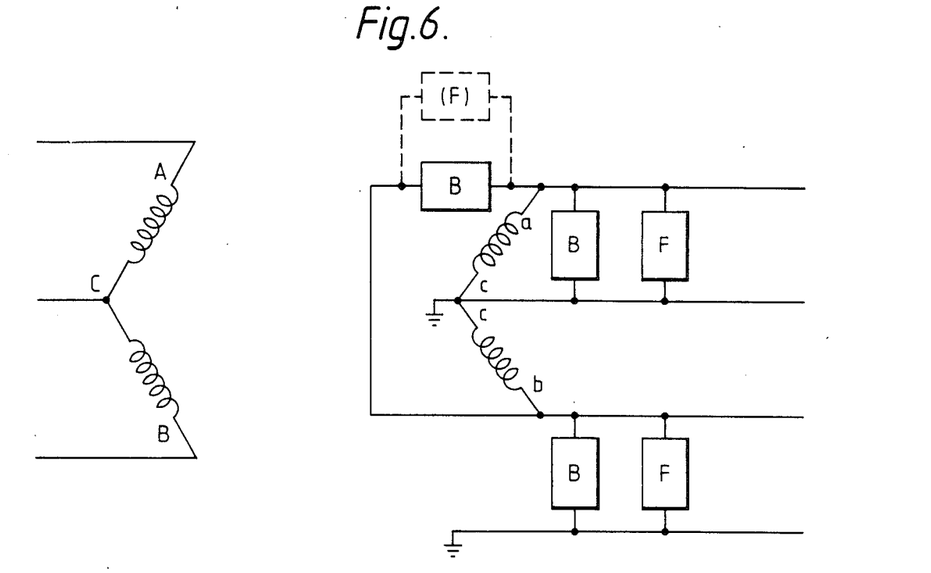
FIG. 6 shows a further alternative arrangement for deriving a third phase for balancing in a two-phase system.

FIG. 6 shows how the phasing of the two traction transformer secondaries ac and bc may be rearranged to provide an appropriate supply (ac) for the third phase of the phase-balancing equipment without the need for a third transformer. This method is particularly attractive because it not only saves a transformer, but also significantly reduces the loading on the two transformers which are used.

Figure 7A:
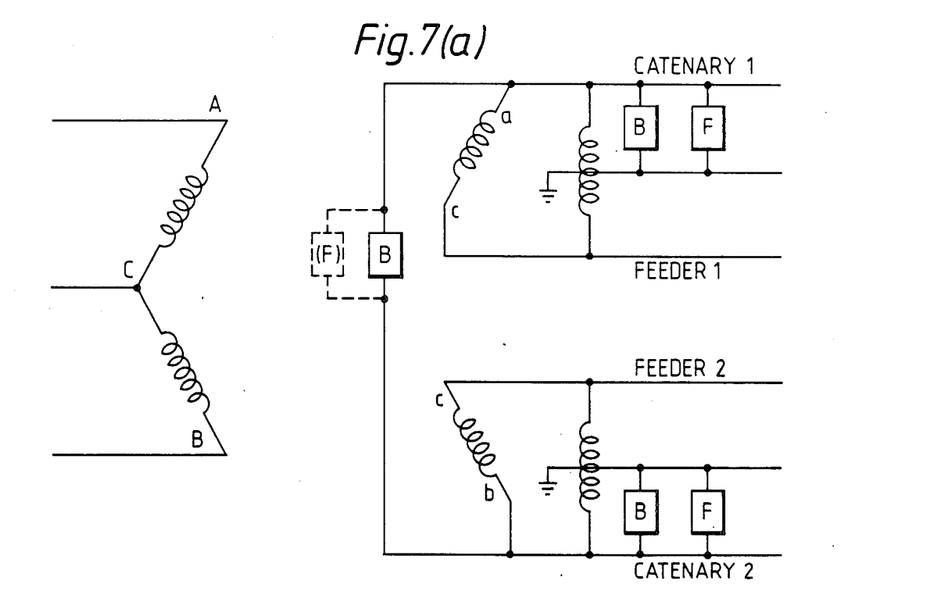
FIG. 7(a) shows a similar arrangement in a supplementary feeder system and FIG. 7(b) the corresponding phase diagram.
Figure 7B:
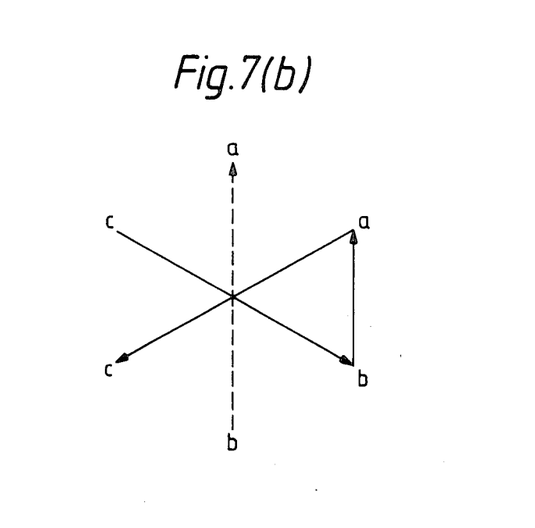
Figure 8:
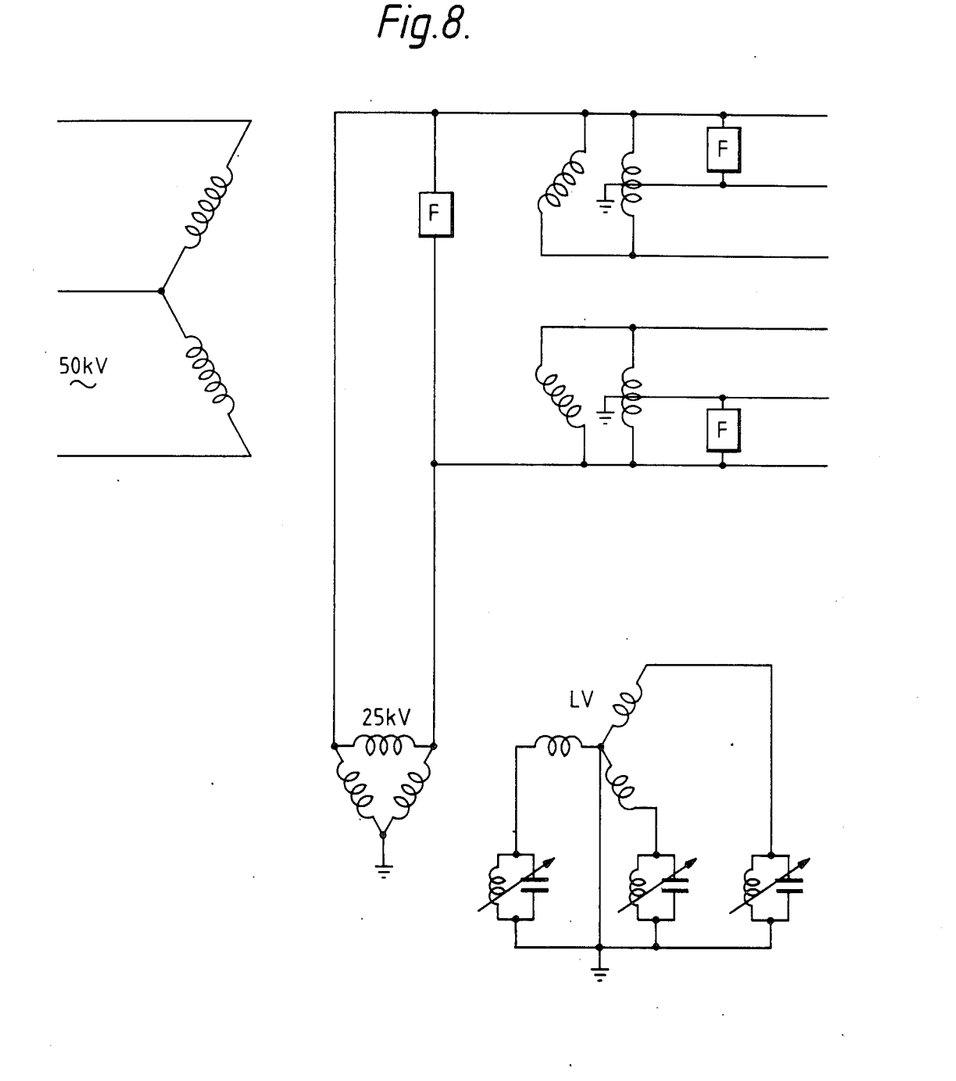
FIG. 8 shows an arrangement for providing a third phase and individual phase-balancing circuits in a two-phase traction system.

FIG. 7(a) shows similarly how the principle illustrated in FIG. 6 may be applied in the case when 50 kV supply transformers are used with a 25 kV traction system. FIG. 7b shows the vector diagram in this case. This arrangement also reduces the loading on the two existing traction transformers and enables all the phase balancing equipment to be connected directly at 25 kV—or, as in FIG. 8, via a 3-phase 25 kV/LV transformer.

In several of the above cases it may be advantageous to connect a filter of the type used for the 25 kV traction system in parallel with the third phase of the balancing equipment rather than using a specially designed filter for this purpose. This is illustrated by the dotted lines in FIGS. 5, 6 and 7 and in full lines in FIG. 8.

For a substation which is equipped with only one single-phase traction transformer but which supplies a load large enough to require phase-balancing equipment it is only necessary to add a single transformer of appropriate type and rating to convert the substation layout to that shown in FIG. 6 or FIG. 7 as appropriate.

An additional benefit of this application of phase-balancing and power factor correction equipment at the level of the traction system voltage is that the voltage regulation of the supply system can be virtually eliminated at the 25 kV (or 50 kV) terminals of the traction substation. There will be correspondingly little voltage variation induced onto the HV system by the balanced traction load. If sufficient controllable MVAr is provided in the phase-balancing equipment, it can also be used to stabilise the 25 or 50 kV traction supply voltage in the face of normal variations of the HV supply system.

When a leading power factor load is permissible, then some overcompensation might be applied to counteract the effects of voltage drop in the catenary and track feeder system at distant points on the track so enabling greater track lengths to be supplied and reducing the number of feeder substations which are necessary. Alternatively, or in addition to the above, the phase-balancing equipment on the traction system can be deliberately controlled to improve the balance and/or voltage control of the HV system.

I claim:

1. An A.C. power supply system in which a high voltage three-phase system is transformed to provide one or more single-phases of a low voltage system connected for the supply of respective single-phase loads, said power supply system comprising:
    (a) a respective-phase-balancing circuit for each of said one or more single-phases derived from the transformed supply,
    (b) said phase-balancing circuits being controllable to tend to reduce negative phase-sequence currents in the high voltage system, and
    (c) a respective harmonic filter for each of said phase-balancing circuits for the absorption of load-generated harmonic currents and additionally for the accommodation of harmonic currents generated by the associated phase-balancing circuit.

2. A power supply system in accordance with claim 1 for use in a single-phase traction supply system.

3. A power supply system according to claim 1, wherein said low-voltage system comprises, for each loaded phase, a main supply conductor, an earth return conductor and a supplementary supply conductor, the main and supplementary conductors being connected to a supply transformer secondary winding of greater voltage than the operating low voltage, a required proportion of the said greater voltage being applied between the main and earth return conductors by an auto-transformer connected between the main and supplementary conductors.

4. A power supply system according to claim 3 wherein each phase-balancing circuit is connected between the main and the supplementary supply conductors and each harmonic filter is connected between the main supply conductor and the earth return.

5. A power supply system according to claim 3 or claim 4, wherein two single-phase transformers are connected to supply two single-phase loads each by way of main, supplementary and earth return conductors, and wherein a third phase-balancing circuit is connected between the appropriate conductors of said two single-phase loads to derive a third phase voltage.

6. A power supply system according to claim 3, including two single-phase supply transformers for supplying two single-phase loads, a three-phase step-down transformer having delta-connected primary windings one of which is connected between an appropriate conductor of each of said single-phase loads to derive a third phase voltage, the remaining junction of the delta windings being earthed to provide three phase currents in the delta-windings, and the secondary windings of the three-phase transformer being connected to respective phase-balancing circuits.

7. A power supply system according to claim 6, wherein two of said harmonic filters are connected between each main conductor and its associated earth return and a third harmonic filter is connected in parallel with said one delta-connected primary winding.

8. A power supply system according to claim 1, wherein two single-phase transformers are connected to supply the single-phase loads and a third single-phase transformer is provided to supply a said phase-balancing circuit.

9. A power supply system according to claim 1, wherein two single-phase transformers are connected to supply the single-phase loads and respective phase-balancing circuits, and wherein an auto-transformer is connected across the secondary winding of one of said single-phase transformers to provide a voltage in antiphase with the voltage of that secondary winding, connections to the other secondary winding and the auto-transformer providing a third phase voltage for the supply of a third phase-balancing circuit.

10. A power supply system according to claim 1, wherein two single-phase transformers are connected to supply the single-phase loads and respective phase-balancing circuits and wherein the secondary windings of the two single-phase transformers are connected together at one end in appropriate phase relationship such that the voltage between their other ends provides the third phase for supplying a third phase-balancing circuit.

11. A power supply system according to claim 1 including a controllable power factor correction circuit associated with each phase-balancing circuit.

* * * * *